(12) United States Patent
Fornos Martinez et al.

(10) Patent No.: US 12,515,407 B2
(45) Date of Patent: Jan. 6, 2026

(54) GENERATION OF PRINT CONFIGURATION DATA FOR THREE DIMENSIONAL PRINTERS

(71) Applicant: Peridot Print LLC, Palo Alto, CA (US)

(72) Inventors: Pol Fornos Martinez, Sant Cugat del Valles (ES); Arnau Codina Saborit, Sant Cugat del Valles (ES); Ismael Fernandez Aymerich, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 622 days.

(21) Appl. No.: 17/767,715

(22) PCT Filed: Oct. 29, 2019

(86) PCT No.: PCT/US2019/058467
§ 371 (c)(1),
(2) Date: Apr. 8, 2022

(87) PCT Pub. No.: WO2021/086318
PCT Pub. Date: May 6, 2021

(65) Prior Publication Data
US 2023/0278290 A1    Sep. 7, 2023

(51) Int. Cl.
*B29C 64/182*    (2017.01)
*B29C 64/255*    (2017.01)
(Continued)

(52) U.S. Cl.
CPC .......... *B29C 64/386* (2017.08); *B29C 64/182* (2017.08); *B29C 64/255* (2017.08); *B33Y 10/00* (2014.12); *B33Y 50/00* (2014.12)

(58) Field of Classification Search
CPC ... B29C 64/182; B29C 64/255; B29C 64/386; B33Y 10/00; B33Y 50/00
See application file for complete search history.

(56) References Cited

U.S. PATENT DOCUMENTS 8,718,522 B2    5/2014  Chillscyzn et al.
9,636,871 B2    5/2017  Butler et al.
(Continued)

FOREIGN PATENT DOCUMENTS

JP    2017-148996 A    8/2017
WO    2016077250        5/2016
(Continued)

OTHER PUBLICATIONS

International Searching Authority, "Search Report and Written Opinion," issued in connection PCT/US2019/058467, mailed Jul. 16, 2020, 6 pages.

*Primary Examiner* — Mark A Connolly
(74) *Attorney, Agent, or Firm* — Michael Dryja

(57) ABSTRACT

Object model data defining a plurality of objects to be built by a three-dimensional printing apparatus is obtained. The plurality of objects to be built are arranged in a configuration to be printed with objects having a first property arranged in a first separable region of a build volume and objects having a second property arranged in a second separable region of the build volume. Print data defining the configuration of the plurality of objects to be built is generated.

17 Claims, 4 Drawing Sheets

(51) Int. Cl.
    *B29C 64/386*     (2017.01)
    *B33Y 10/00*     (2015.01)
    *B33Y 50/00*     (2015.01)

(56) References Cited

U.S. PATENT DOCUMENTS

| | | |
|---|---|---|
| 10,328,686 B2 | 6/2019 | Iverson et al. |
| 10,552,095 B1 * | 2/2020 | Lawson ................ G06F 3/1218 |
| 2015/0057784 A1 | 2/2015 | Butler et al. |
| 2017/0173888 A1 * | 6/2017 | Thomas-Lepore ..... H04L 51/52 |
| 2017/0173889 A1 | 6/2017 | Thomas-Lepore et al. |
| 2018/0024517 A1 | 1/2018 | Halperin |
| 2018/0093417 A1 | 4/2018 | Yaw et al. |
| 2019/0204769 A1 | 7/2019 | Rice et al. |
| 2019/0286384 A1 | 9/2019 | Torrent et al. |
| 2019/0351612 A1 * | 11/2019 | Huang .................. B33Y 80/00 |
| 2021/0122109 A1 * | 4/2021 | Sayers ................. B29C 64/386 |

FOREIGN PATENT DOCUMENTS

| | | |
|---|---|---|
| WO | 2017194144 | 11/2017 |
| WO | 2017196355 | 11/2017 |
| WO | 2019/005708 A3 | 1/2019 |
| WO | 2019/194837 A1 | 10/2019 |

* cited by examiner

GENERATION OF PRINT CONFIGURATION DATA FOR THREE DIMENSIONAL PRINTERS

RELATED APPLICATION

This patent arises from the U.S. national stage of International Patent Application Serial No. PCT/US2019/058467, filed Oct. 29, 2019, and entitled "GENERATION OF PRINT CONFIGURATION DATA FOR THREE DIMENSIONAL PRINTERS." Priority is claimed to International Patent Application Serial No. PCT/US2019/058467. International Patent Application Serial No. PCT/US2019/058467 is hereby incorporated by reference in its entirety.

BACKGROUND

Following completion of a build operation in a three-dimensional (3D) printer that uses raised temperatures during printing, built objects may be cooled. The built objects may be removed from the printer for cooling or remain in the printer for cooling.

DETAILED DESCRIPTION

In some 3D printers, an object or a plurality of separate objects may be built by selectively heating, melting, and fusing powder particles in a build chamber of a build unit that is connected to a printing unit which controls the build operation. After the completion of the build operation, the build chamber may include a plurality of 3D objects, formed from build material solidified by the 3D printer, along with non-solidified build powder from the build operation. The objects may be left to cool naturally within the build chamber or cooling may be sped up, for example by using an appropriate cooling mechanism. Alternatively, the contents of a build chamber can be removed from the build unit before cooling is complete such that the objects within the build chamber are cooled remotely. This allows the build unit to be available for other build operations. Cooling time adds significantly to the total delivery time for printed objects.

Different printed objects within the same build operation may have different properties, for example the urgency with which some printed objects are to be made available, the quality of the objects once built or the intended customer of the objects to be built. In addition, some of these properties may be combined, such as if a particular customer has made an urgent request for some printed objects and a different customer has made a less urgent request for other printed objects, it may be helpful to be able to prepare both sets of printed objects within the same build operation.

The present disclosure describes how a build operation can be planned such that printed parts may be separated from each other after printing and how the printed parts may be separated from each other. The separation of printed parts may facilitate different cooling regimes being applied to different printed parts from the same build operation, which may then facilitate the delivery of some printed parts that are cooled more quickly than other printed parts.

Figure 1:
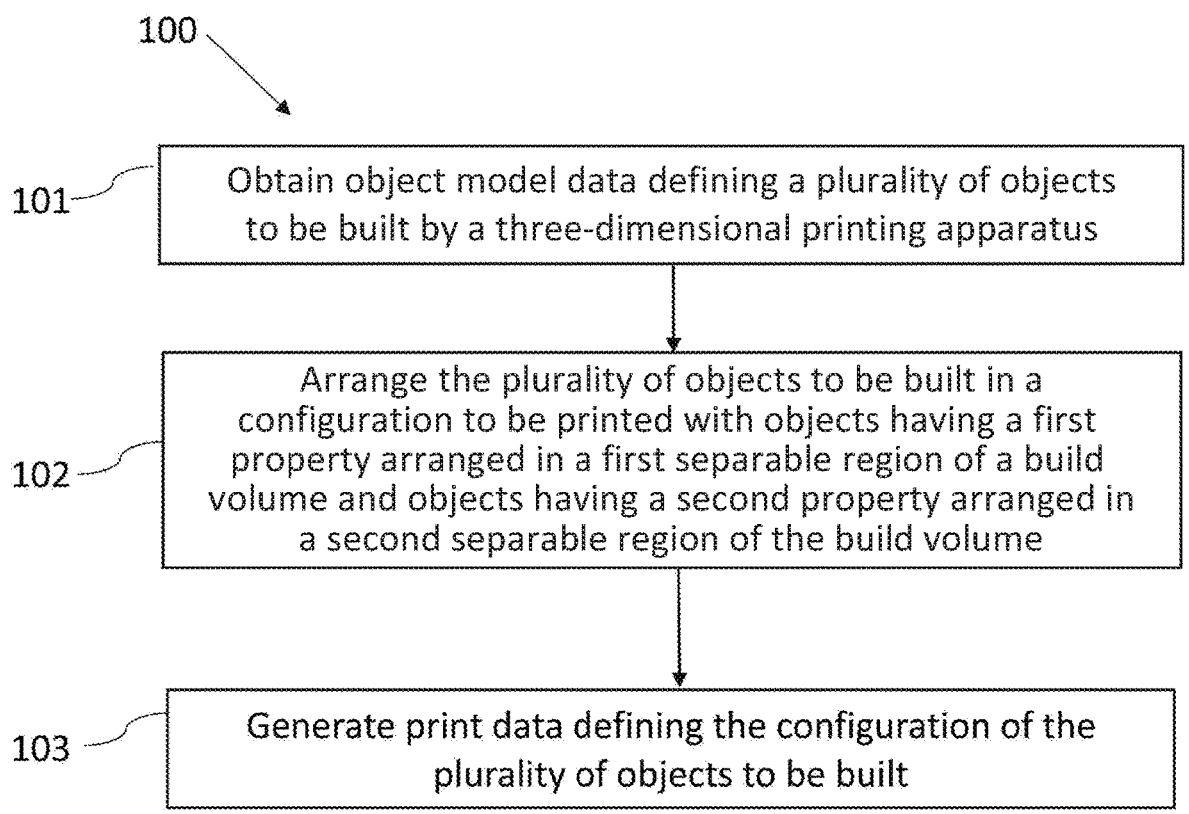
FIG. 1 is a flowchart showing an example of a method for generating print data defining the configuration of the plurality of objects to be built.

FIG. 1 shows an example of a method 100 for defining the configuration of a plurality of objects to be built in a 3D printing apparatus. The method comprises obtaining 101 object model data defining the plurality of objects to be built by a 3D printing apparatus, arranging 102 the plurality of objects to be built in a configuration to be printed with objects having a first property arranged in a first separable region of a build volume and objects having a second property arranged in a second separable region of the build volume, and generating 103 print data defining the configuration. Arranging the plurality of objects to be built in a configuration to be printed with objects having a first property arranged in a first separable region and objects having a second property arranged in a second separable region may be known as nesting. Arranging the objects into separable regions according to, for example, how urgently a user would like some of the objects to be made available may be beneficial to a user intending to print a plurality of objects. For example, printing a single print job in which the printed objects are arranged in separate separable regions according to urgency may be less time consuming and use fewer resources than printing multiple, smaller print jobs with a first print job intended to produce urgent objects and a second print job intended to produce less urgent objects.

In some examples, obtaining 101 object model data defining the plurality of objects to be built by a 3D printing apparatus comprises receiving a user specified property for each of the plurality of objects to be built. A user may specify the property before the object model data is input into a controller, as the object model data is input into a controller or a property could be assigned by a user to the object model data after it has been input into a controller. The user specified property may be any property that may be assigned to a printed object, including those discussed above.

In some examples, the method 100 further comprises using the object model data to determine the property of each of the plurality of objects to be built prior to the arranging 102 of the plurality of objects to be built in a configuration to be printed. A controller may use the object model data to determine a property by analysing any of the data such as the file name or the dimensions of the object to be built. The determined property may be any property that may be assigned to a printed object, including those discussed above.

In some examples, the first separable region of a build volume is vertically separated from the second separable region of a build volume, such that the objects having a first property are separated in the z direction (sometimes referred to as the xy plane) from the objects having a second property. For example, the objects in the first separable region may be arranged in the bottom half of a build volume and the objects in the second separable region may be arranged in the top half of a build volume. Arranging 102 the plurality of objects to be built in a configuration to be printed may comprise including multiple layers of unfused build material in the configuration, wherein the multiple layers separate the first separable region of a build volume from the second separable region of a build volume. The multiple layers of unfused build material may cover the whole xy plane of the build volume thus providing horizontal layers that separate the two separable regions into a region above the multiple layers of unfused build material and a region below the multiple layers of unfused build material. This vertical separation of the separable regions facilitates the removal of the objects having a first property from the objects having a second property by vertical movement of the build volume such that one separable region of the build volume can be removed from the build unit. Vertical separation also ensures that, in the event of print job failure, the objects within the separable region of the build volume that is intended to be printed first are more likely to have completed printing. By generating print data defining a configuration in which urgent parts are placed within the separable region of the build volume that is intended to be printed first, it may be possible to retrieve such urgent parts from the build volume in the event of print job failure. Additionally, parts that are printed first will start to cool within the build volume whilst the print job continues and thus may be made available more quickly on completion of printing than parts that are printed towards the end of a print job. However, a user can choose to print less urgent parts within the separable region of the build volume that is intended to be printed first.

In some examples, the first separable region of a build volume is horizontally separated from the second separable region of a build volume, such that the objects having a first property are separated in the x or y direction (sometimes referred to as the yz or xz plane) from the objects having a second property. For example, the objects in the first separable region may be arranged in a first side of a build volume and the objects in the second separable region may be arranged in a second side of a build volume.

In some examples, the print data generated at 103 may comprise sprues. The sprues may be used to connect the objects in the first separable region of a build volume to each other, connect the objects in the second separable region of a build volume to each other or both. Connecting parts together using sprues facilitates the handling of the connected objects as a single part in a downstream workflow. The connected objects may be handled together up to a point where the part may be divided into smaller sub-groups for sub-workflow differentiation. After this, the objects may be detached individually from the sprue. Grouping the objects in this way may give rise to workflow efficiency gains, wherein objects being subjected to a given post-processing operation may be handled as a single part instead of being processed individually.

In some examples, the print data generated at 103 may comprise a cage to wholly or partially surround printed objects. A cage may wholly or partially surround the objects in the first separable region of a build volume or it may wholly or partially surround the objects in the second separable region of a build volume. Two separate cages may each wholly or partially surround the objects in separate separable regions of a build volume. The cages may facilitate movement of the build unit or removal of objects from the build unit without damage being caused to the built objects while they are in a structurally vulnerable state (i.e. when not yet fully cooled). Thus, a cage can perform a protective function during cooling.

In some examples, the method 100 may further comprise generating data to control the speed at which different layers of unfused build material are to be spread across a build area, the depth of different layers of unfused build material that are spread across a build area, the speed at which a layer of unfused build material is fused, or any combination thereof. Thus, in an example, the layers used to form the objects having a first property are printed from layers of unfused build material that are spread across the build area at a different speed from the layers used to form the objects having a second property, the layers used to form the objects having a first property are printed from layers of unfused build material that are thicker or thinner than the layers used to form the objects having a second property, the layers used to form the objects having a first property are printed from layers of unfused build material that are fused at a different speed from the layers used to form the objects having a second property, or a combination thereof. Generally, the faster the speed at which different layers of unfused build material are spread across a build area and/or the greater the depth of the different layers of unfused build material that are spread across a build area and/or the greater the speed at which a layer of unfused build material is fused, the faster an object may be printed. Additionally, the slower the speed at which different layers of unfused build material are spread across a build area and/or the more shallow the depth of the different layers of unfused build material that are spread across a build area and/or the slower the speed at which a layer of unfused build material is fused, the higher the quality of a printed object. Therefore, adjusting these factors may help speed up the 3D printing process and/or modify the quality of the printed objects. Furthermore, adjusting these factors within a build volume may facilitate faster delivery times for printed objects within a first or a second separable region of a build volume and/or differing quality printed objects within a first or a second separable region of a build volume. However, it may also be desirable to keep all the printing parameters the same, for example when the printed objects within the separable regions are to be built to the same quality and with the same urgency but the objects in a first separable region of a build volume are intended for a different customer from the printed objects in a second separable region of a build volume.

Figure 2:
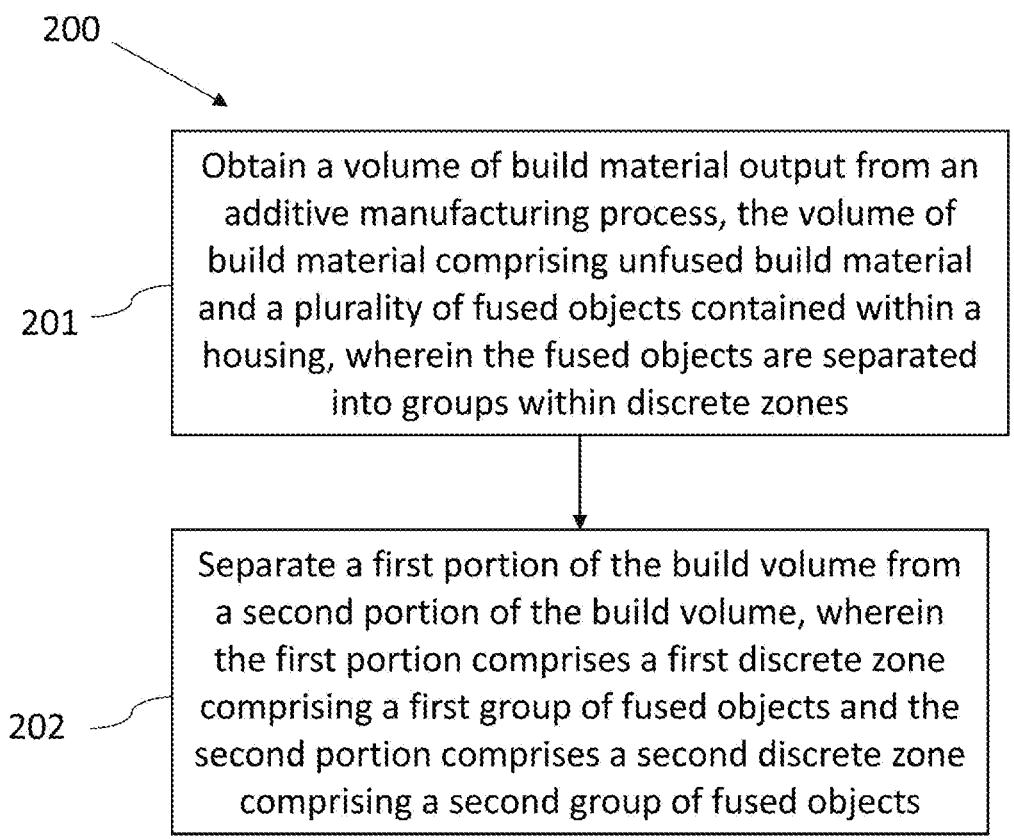
FIG. 2 is a flowchart showing an example of a method for obtaining a volume of build material output from an additive manufacturing process and separating the build volume into two portions, each portion comprising built objects.

FIG. 2 shows an example of a method 200 for obtaining 201 a volume of build material output from an additive manufacturing process, the volume of build material comprising unfused build material and a plurality of fused objects contained within a housing, wherein the fused objects are separated into groups within discrete zones, and separating 202 a first portion of the build volume from a second portion of the build volume, wherein the first portion comprises a first discrete zone comprising a first group of fused objects and the second portion comprises a second discrete zone comprising a second group of fused objects. Separating 202 a first portion of a build volume from a second portion of a build volume may be beneficial to a user who has produced a plurality of fused objects in an additive manufacturing process since it facilitates the application of different post-processing methods to the fused objects in each portion of the build volume.

Figure 3:
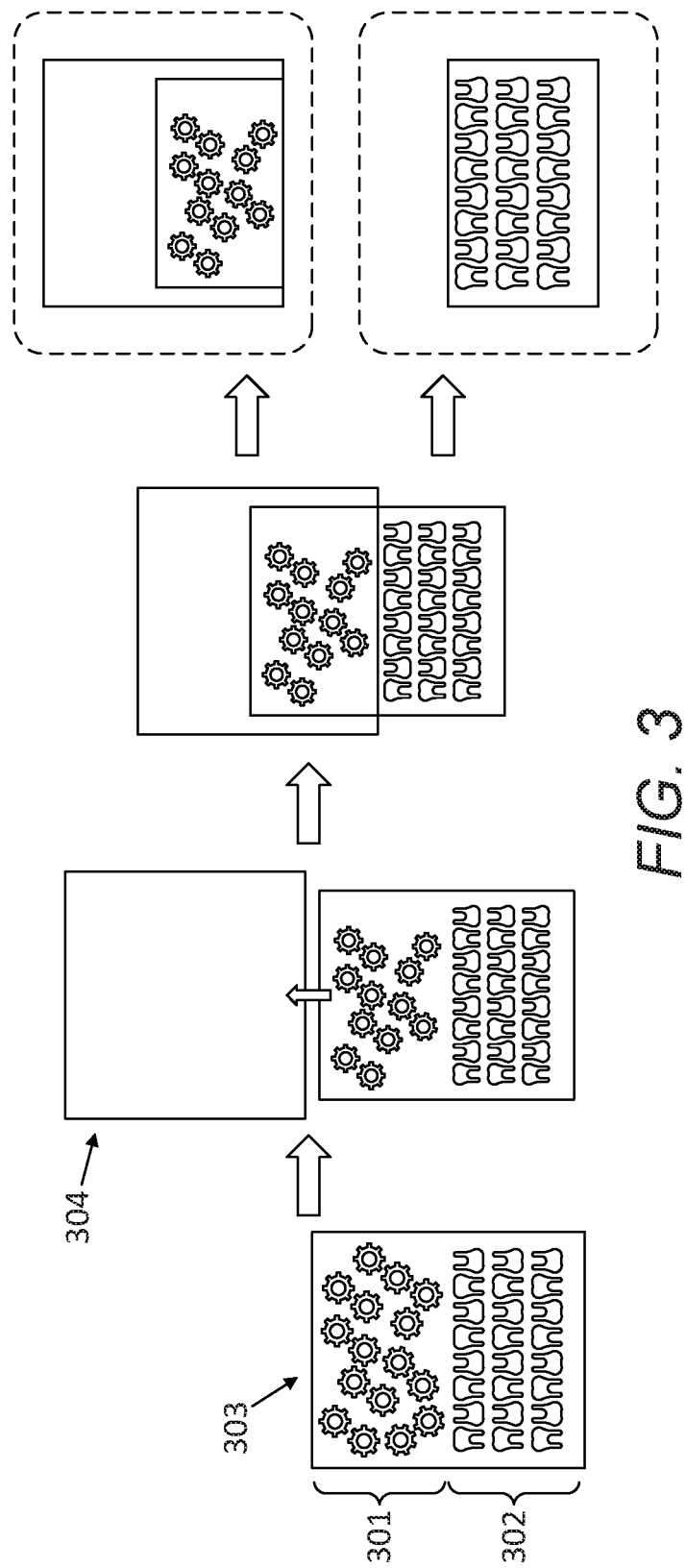
FIG. 3 shows a further example of a method for obtaining a volume of build material output from an additive manufacturing process and separating the build volume into two portions, each portion comprising built objects.

In some examples, as shown in FIG. 3, the first portion 301 of the build volume 303 may be received by a container 304 and removing the container 304 separates the first portion 301 of the build volume from the second portion 302 of the build volume. To facilitate the separation of a first portion 301 of the build volume 303 from a second portion 302 of the build volume 303, a rigid plate, or guillotine, (not shown) may slidably engage with the container 304 to form a base of the container 304 prior to the removing of the container 304.

The first portion 301 of the build volume 303 comprises fused objects, which objects may be allowed to cool in the container 304. This may be known as passive cooling or natural cooling. The container may be removed to a location remote from the housing and stored until the fused objects have cooled to a desired temperature.

The second portion 302 of the build volume 303 comprises fused objects, which objects may be cooled in the housing. The speed at which the fused objects within the housing second portion 302 of the build volume 303 are cooled may be increased so that the delivery time for the fused objects within the second portion 302 of the build volume 303 is reduced. This may be known as active cooling or forced cooling. In some examples, the speed at which fused objects are cooled in the housing may be increased by attaching a connector to the housing, attaching the connector to a pressure source, and generating a flow of air through the housing so as to remove unfused build material from the housing. The removal of unfused build material may be facilitated by occasional vibration of the housing to dislodge unfused build material. In some examples, the speed at which fused objects are cooled in the housing may be increased by attaching a connector to the housing, attaching the connector to a pressure source, and generating a vacuum so as to remove unfused build material from the housing. The removal of unfused build material may be facilitated by vibration of the housing to dislodge unfused build material.

In some examples, both the fused objects within the first portion 301 and the fused objects within the second portion 302 may undergo forced cooling. For example, the fused objects within the first portion 301 may undergo forced cooling at a first rate and the fused objects within the second portion 302 may undergo forced cooling at a second rate. Alternatively, or in addition, the fused objects within the first portion 301 may undergo forced cooling using a first forced cooling technique and the fused objects within the second portion 302 may undergo forced cooling using a second forced cooling technique.

Figure 4:
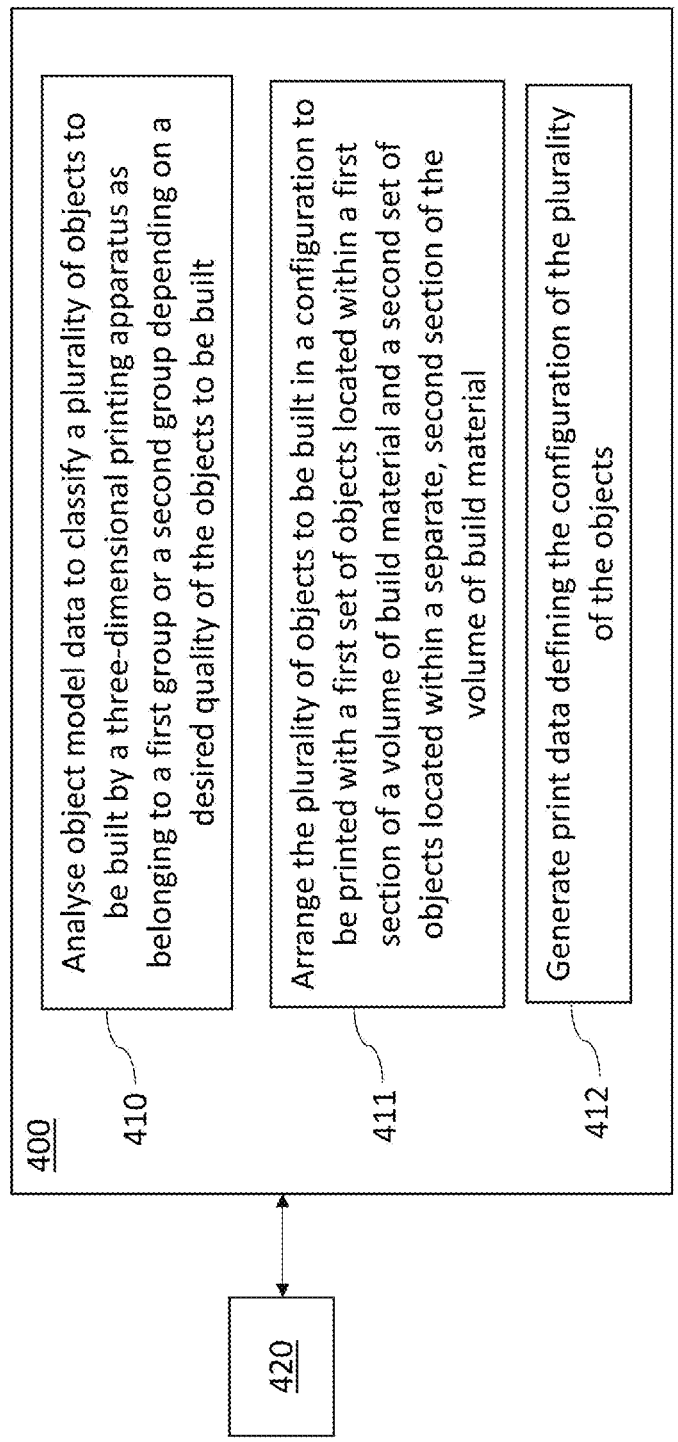
FIG. 4 shows an example of a non-transitory machine-readable storage medium encoded with instructions to generate print data defining the configuration of the plurality of objects to be built.

FIG. 4 shows a memory 400, which is an example of a non-transitory machine-readable storage medium storing instructions that, when executed by a processor 420 generate print data for an additive manufacturing system. The data may be generated by following instructions to analyse 411 object model data to classify a plurality of objects to be built by an additive manufacturing system as belonging to a first group or a second group depending on a desired property of the objects to be built, arrange 412 the plurality of objects to be built in a configuration to be printed with a first set of objects located within a first section of a volume of build material and a second set of objects located within a separate, second section of the volume of build material, and generate 413 print data defining the configuration of the plurality of the objects. The non-transitory machine-readable storage medium may be any electronic, magnetic, optical or other suitable device that stores executable instructions. Thus, the non-transitory machine-readable storage medium may be, for example, Random Access Memory (RAM), and Electrically-erasable Programmable read-Only Memory (EEPROM), a storage drive, an optical disc, and the like. The processor 420 may act as a controller, or as a composite part of a controller that controls a build unit or additive manufacturing apparatus.

The invention claimed is:

1. A method comprising:
   obtaining, by a processor, object model data defining a plurality of objects to be built within a fabrication chamber in a single print job by a three-dimensional printing apparatus such that those of the plurality of objects printed lower in the fabrication chamber are printed before those of the plurality of objects printed higher in the fabrication chamber, the plurality of objects including first objects having higher urgency and second objects having lower urgency;
   arranging, by the processor, the plurality of objects to be built within the fabrication chamber in a configuration such that the first objects are arranged lower in the fabrication chamber and accordingly are printed first by the three-dimensional printing apparatus and such that the second objects are arranged higher in the fabrication chamber and accordingly are printed last by the three-dimensional printing apparatus; and
   generating, by the processor, print data defining the configuration of the plurality of objects to be built such that the first objects are printed before the second objects are printed.

2. The method of claim 1, wherein obtaining the object model data comprises receiving user specification of which of the plurality of objects have higher urgency and thus are the first objects and which of the plurality of objects have lower urgency and thus are the second objects.

3. The method of claim 1, wherein the print data defining the configuration of the plurality of objects comprises first sprues to connect the first objects to each other, and second sprues to connect the second objects to each other.

4. The method of claim 1, wherein the print data defining the configuration of the plurality of objects comprises a first cage to wholly or partially surround the first objects, and a second cage to wholly or partially surround the second objects.

5. The method of claim 1, further comprising:
   causing, by the processor, the three-dimensional printing apparatus to print the plurality of objects within the fabrication chamber in the single print job in accordance with the generated print data defining the configuration such that the first objects having higher urgency are printed in the fabrication chamber before the second objects having lower urgency are printed in the fabrication chamber.

6. The method of claim 1, wherein arranging the plurality of objects in the configuration such that the first objects having higher urgency are printed in the single print job before the second objects having lower urgency are printed in the single print job means that in a case where the three-dimensional printing apparatus is unable to print the second objects in the print job, the first objects having higher urgency have already been printed in the print job and thus are salvageable and do not have to be reprinted again in another print job.

7. A non-transitory computer-readable data storage medium storing program code executable by a processor to perform processing comprising:
   obtaining object model data defining a plurality of objects to be built within a fabrication chamber in a single print job by a three-dimensional printing apparatus such that those of the plurality of objects printed lower in the fabrication chamber are printed before those of the plurality of objects printed higher in the fabrication chamber, the plurality of objects including first objects having higher urgency and second objects having lower urgency;

arranging the plurality of objects to be built within the fabrication chamber in a configuration such that the first objects are arranged lower in the fabrication chamber and accordingly are printed first by the three-dimensional printing apparatus and such that the second objects are arranged higher in the fabrication chamber and accordingly are printed last by the three-dimensional printing apparatus; and generating print data defining the configuration of the plurality of objects to be built such that the first objects are printed before the second objects are printed.

8. The non-transitory computer-readable data storage medium of claim 7, wherein obtaining the object model data comprises receiving user specification of which of the plurality of objects have higher urgency and thus are the first objects and which of the plurality of objects have lower urgency and thus are the second objects.

9. The non-transitory computer-readable data storage medium of claim 7, wherein the print data defining the configuration of the plurality of objects comprises first sprues to connect the first objects to each other, and second sprues to connect the second objects to each other.

10. The non-transitory computer-readable data storage medium of claim 7, wherein the print data defining the configuration of the plurality of objects comprises a first cage to wholly or partially surround the first objects, and a second cage to wholly or partially surround the second objects.

11. The non-transitory computer-readable data storage medium of claim 7, wherein the processing further comprises:

causing the three-dimensional printing apparatus to print the plurality of objects within the fabrication chamber in the single print job in accordance with the generated print data defining the configuration such that the first objects having higher urgency are printed in the fabrication chamber before the second objects having lower urgency are printed in the fabrication chamber.

12. The non-transitory computer-readable data storage medium of claim 2, wherein arranging the plurality of objects in the configuration such that the first objects having higher urgency are printed in the single print job before the second objects having lower urgency are printed in the single print job means that in a case where the three-dimensional printing apparatus is unable to print the second objects in the print job, the first objects having higher urgency have already been printed in the print job and thus are salvageable and do not have to be reprinted again in another print job.

13. The non-transitory computer-readable data storage medium of claim 7, wherein the processor is part of the three-dimensional printing apparatus, such that the three-dimensional printing apparatus performs the processing.

14. The non-transitory computer-readable data storage medium of claim 7, wherein the processor is part of a device different from the three-dimensional printing apparatus, such that the device as opposed to the three-dimensional printing apparatus performs the processing.

15. A non-transitory computer-readable data storage medium storing program code executable by a processor to perform processing comprising:

obtaining object model data defining a plurality of objects to be built within a fabrication chamber in a single print job by a three-dimensional printing apparatus such that those of the plurality of objects printed lower in the fabrication chamber are printed before those of the plurality of objects printed higher in the fabrication chamber, the plurality of objects including first objects having higher urgency and second objects having lower urgency;

arranging the plurality of objects to be built within the fabrication chamber in a configuration such that the first objects are arranged lower in the fabrication chamber and accordingly are printed first by the three-dimensional printing apparatus and such that the second objects are arranged higher in the fabrication chamber and accordingly are printed last by the three-dimensional printing apparatus;

generating print data defining the configuration of the plurality of objects to be built such that the first objects are printed before the second objects are printed; and causing the three-dimensional printing apparatus to print the plurality of objects within the fabrication chamber in the single print job in accordance with the generated print data defining the configuration such that the first objects having higher urgency are printed in the fabrication chamber before the second objects having lower urgency are printed in the fabrication chamber, wherein arranging the plurality of objects in the configuration such that the first objects having higher urgency are printed in the single print job before the second objects having lower urgency are printed in the single print job means that in a case where the three-dimensional printing apparatus is unable to print the second objects in the print job, the first objects having higher urgency have already been printed in the print job and thus are salvageable and do not have to be reprinted again in another print job.

16. The non-transitory computer-readable data storage medium of claim 15, wherein the processor is part of the three-dimensional printing apparatus, such that the three-dimensional printing apparatus performs the processing.

17. The non-transitory computer-readable data storage medium of claim 15, wherein the processor is part of a device different from the three-dimensional printing apparatus, such that the device as opposed to the three-dimensional printing apparatus performs the processing.

* * * * *